United States Patent [19]

Tanaka

[11] Patent Number: 4,893,042
[45] Date of Patent: Jan. 9, 1990

[54] ROTOR FOR DC MOTOR

[75] Inventor: Toshinori Tanaka, Hyogo, Japan

[73] Assignee: Mitsubishi Denki Kabushiki Kaisha, Tokyo, Japan

[21] Appl. No.: 165,593

[22] Filed: Mar. 8, 1988

[30] Foreign Application Priority Data

Mar. 12, 1987 [JP] Japan .................................. 62-59144
Mar. 12, 1987 [JP] Japan ............................. 62-37725[U]

[51] Int. Cl.4 .............................................. H02K 1/00
[52] U.S. Cl. ..................................... 310/216; 310/42; 310/195; 310/261
[58] Field of Search ................. 310/46, 177, 179, 195, 310/42, 214, 216, 217, 218, 261, 262, 264, 265, 267, 156; 336/211–213, 216, 218, 234

[56] References Cited

U.S. PATENT DOCUMENTS

| 2,630,463 | 3/1953 | Smith | 310/214 |
| 3,013,168 | 12/1961 | Ellis | 310/261 |
| 4,363,986 | 12/1982 | Joho | 310/214 |
| 4,712,034 | 12/1987 | Iwasaki | 310/216 |

FOREIGN PATENT DOCUMENTS 3140437 4/1983 Fed. Rep. of Germany ...... 310/195
0221551 10/1986 Japan.

Primary Examiner—R. Skudy
Attorney, Agent, or Firm—Wolf, Greenfield & Sacks

[57] ABSTRACT

A rotor for a DC motor comprising an axial lamination of core sheets having a plurality of radially and inwardly extended slits, and armature coils wound around said lamination through said slits. The core sheets are entirely or partially formed of electromagnetic steel plate and a soft iron member is provided for partially closing the opening of said slits in said lamination through which the coils are wound.

11 Claims, 3 Drawing Sheets

ROTOR FOR DC MOTOR

BACKGROUND OF THE INVENTION

1. Field of the Invention

The present invention relates to improvements in rotors for DC motors.

2. Description of the Prior Art

As described in Japanese Published Unexamined Patent Application (OPI) No. 221551/1986, prior art DC motors have rotors consisting of an axial lamination of core sheets of soft iron plate having a plurality of radial and inward slits through which armature coils are wound. The lamination of core sheets is mounted on an armature rotary axis. Such a prior art rotor has a so-called semi-closed structure in which the opening of the slits in each core sheet are partially closed by a folding portion. The reason why the opening of the slits in each core sheet is half closed is that this semi-closed structure provides an advantageous magnetic circuit.

The prior art rotor has a lamination of a plurality of core sheets of soft iron plate because it is difficult to form such a semi-closed rotor from thin electromagnetic steel plates by folding the opening of slits in each core sheet. However, the prior art rotor comprising a lamination of core sheets of soft iron plate is disadvantageous in that the iron loss cannot be decreased, thus making it impossible to improve the motor output.

SUMMARY OF THE INVENTION

It is therefore an object of the present invention to provide a DC motor rotor which achieves a reduced level of iron loss.

It is another object of the present invention to provide a DC motor rotor which achieves a reduced level of iron loss and provides an advantageous magnetic circuit.

These and other objects of the present invention are accomplished by an embodiment of the present invention. The present invention provides a DC motor rotor comprising an axial lamination of core sheets consisting of plates having a plurality of radially and inwardly extended slits, and armature coils wound on said lamination through said slits, said core sheets being entirely or partially formed of electromagnetic steel, and the opening of said slits being partially closed by a soft iron member. The soft iron member is preferably formed of a cylindrical unit having a plurality of slots for partially closing the opening of said slits and such a structure that said lamination is inserted thereinto, or core sheets of soft iron plate which are laminated alternately with said core sheets of electromagnetic plate and deformed in the vicinity of the opening of said slits so that the opening of said slits are partially closed.

Other features and advantages of the invention will be apparent from the following description taken in connection with the accompanying drawings.

DESCRIPTION OF THE PREFERRED EMBODIMENTS

Figure 1:
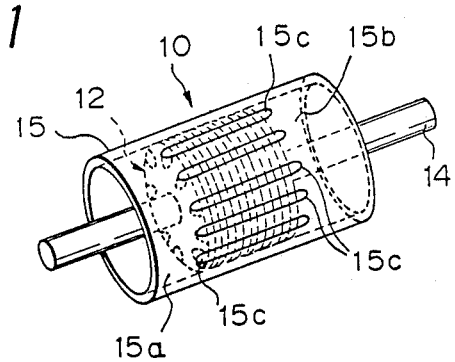
FIG. 1 is a perspective view of an embodiment of a DC motor rotor of the present invention.

The present invention will be further illustrated with reference to a preferred embodiment of a DC motor rotor of the present invention as shown in the drawings.

Figure 2A:
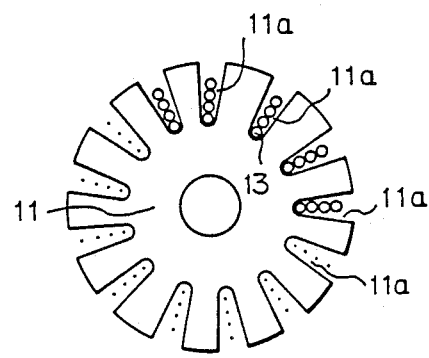
FIG. 2A is a plan view of a core sheet constituting the rotor of FIG. 1.
Figure 2B:
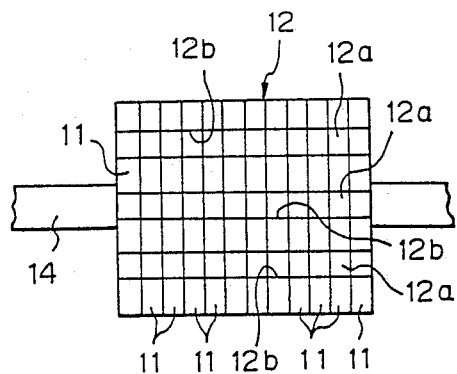
FIG. 2B is a front view of a lamination of the core sheets of FIG. 2A.

Referring to FIG. 1, an embodiment of a rotor of the present invention for a DC motor is shown at 10. The rotor 10 comprises an axial lamination 12 in which core sheets 11 of electromagnetic steel plate such as silicon steel plate having a plurality of radially and inwardly extended slits 11a formed at equal spacings around the circumference thereof, as shown in FIG. 2A, are axially laminated, as shown in FIG. 2B. In the lamination 12, the slits 11a in the core sheets 11 are arranged to form axially extended grooves 12a through which coils are wound. The grooves 12a have a fully-open structure having no closed portion at openings 12b. A conductor 13 is wound several times around the lamination 12 through said grooves 12a to form an armature coil. The lamination 12 is mounted on an armature rotary axis 14.

The lamination 12 is tightly housed in a cylindrical unit 15 made of soft iron. The cylindrical unit 15 is greater than the lamination 12 in axial length. Accordingly, the two ends 15a, 15b are axially and outwardly extended beyond the respective ends of the lamination 12. The cylindrical unit 15 comprises a plurality of axially extended slots 15c formed on the circumference of the middle part thereof. These slots 15c are arranged in such a position as to be superimposed on the grooves 12a and have such a width as to circumferentially and partially close the opening 12b of the grooves 12a. In this regard refer to FIG. 3.

An electromagnetic steel plate exhibits a smaller degree of iron loss and provides a higher magnetic flux density than a usual soft iron plate. Table 1 shows the comparison between 0.8-mm thick soft iron plate and 0.5-mm thick electromagnetic steel plate in regard to these properties.

TABLE 1

| | Iron loss $\begin{bmatrix} B = 1.5 \text{ Tesla} \\ f = 60 \text{ Hz} \end{bmatrix}$ | Magnetic Flux Density [1000 A/m . h] |
|---|---|---|
| Soft Iron Plate (0.8t) | 24 W/kg | 1.31 Tesla |
| Electromagnetic Steel (0.5t) | 14.5 W/kg | 1.51 Tesla |

Thus, the thinner the core sheet is, the lower the iron loss suffered. In this respect, the electromagnetic steel plate can be advantageously used if it has a reduced thickness. Conversely, such a thin plate is disadvantageous in that it cannot be normally be formed into a folded portion for partially closing the opening of slits in core sheets, thus making it impossible to provide a desired magnetic circuit. However, this embodiment has a structure in which a lamination of a plurality of a core sheets of electromagnetic steel plate is housed in a cylindrical unit 15 in such an arrangement that the opening of the grooves in which the coils are wound are partially closed. With such an arrangement, the above described properties can together be improved. Specifically, the iron loss is decreased, improving the motor output, and at the same time, the magnetic flux density is increased, improving the torque.

The ends 15a, 15b of the cylindrical unit 15 which protrude beyond the respective ends of the lamination 12 serve to prevent the coil ends from overrunning.

Figure 3:
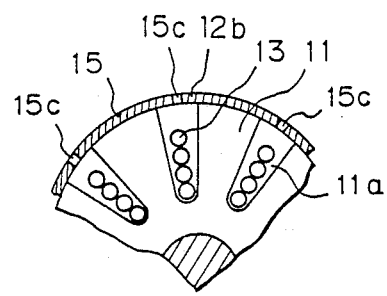
FIG. 3 is a fragmentary sectional view of the rotor of FIG. 1.

The present invention will be further illustrated hereinafter with reference to another embodiment shown in FIGS. 4 to 5B. Those parts which are the same as those in FIGS. 1 to 3 are given the same reference number.

Figure 4:
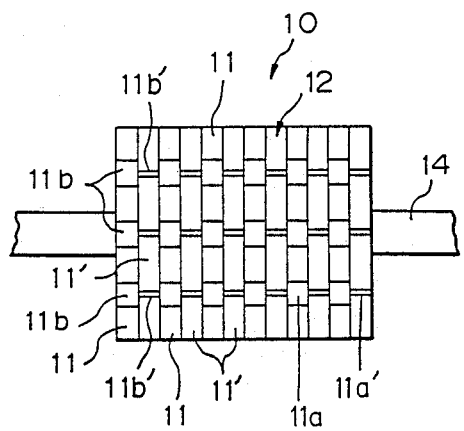
FIG. 4 is a front view of another embodiment of the DC motor rotor of the present invention.
Figure 5A:
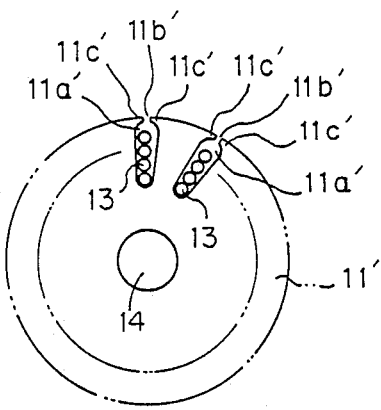
FIG. 5A is a plan view of a core sheet of soft iron plate constituting the rotor of FIG. 4.
Figure 5B:
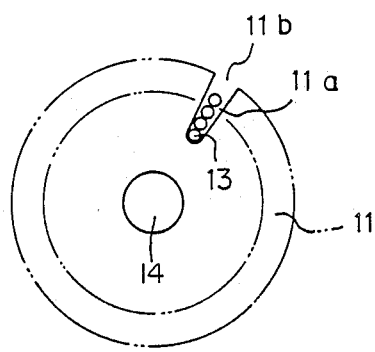
FIG. 5B is a plan view of a core sheet of electromagnetic steel plate constituting the rotor of FIG. 4.

Referring to FIG. 4, another embodiment of the DC motor rotor of the present invention is shown at 10. The rotor 10 comprises an axial lamination 12 in which core sheets 11' of soft iron plate having a plurality of radially and inwardly extended slits 11a' formed at equal spacing around the circumference thereof are axially laminated alternately with core sheets 11 made of electromagnetic steel plate such as silicon steel plate having a plurality of radially and inwardly extended slits 11a formed at equal spacings around the circumference thereof as shown in Figs. 5A and 5B. The opening 11b' of the slits 11a' in the core sheets 11' of soft iron plate have a so-called semi-closed structure. The semi-closed structure is accomplished by deforming the opening 11b' after winding a conductor through the grooves formed by axially laminating the core sheets several times so that the slits 11a are partially closed by folded portions 11c' as depicted in FIG. 5A. On the other hand, the opening 11b of the slits 11a in the core sheets 11 of electromagnetic steel plate has a fully-open structure as depicted in FIG. 5B. The lamination 12 is mounted on an armature rotary axis 14.

As previously mentioned, the thinner the core sheet is, the lower the iron loss suffered. In this respect, the electromagnetic steel plate can be advantageously used if it has a reduced thickness. Conversely, such a thin plate is disadvantageous in that it cannot normally be formed into a folded portion for partially closing the opening of slits in core sheets, making it impossible to provide a desired magnetic circuit. However, this embodiment has a structure wherein core sheets of soft iron plate are laminated alternately with core sheets of electromagnetic steel plate. With such an arrangement, the properties of the two types of core sheets are combined. In this embodiment also, the iron loss is decreased, improving the motor output, while at the same time, the magnetic flux density is increased, improving the torque.

While the present invention has been described in detail and with reference to specific embodiments thereof, it will be apparent to those skilled in the art that various changes and modifications can be made therein without departing from the spirit and scope thereof.

What is claimed is:

1. A rotor for a DC motor comprising an axial lamination of core sheets each having a plurality of radially and inwardly extended slits, said slits having an open portion at the circumferential periphery of said core sheets, said core sheets aligned so that said slits in said core sheets, when the core sheets are axially laminated, define longitudinal grooves in said lamination at the circumferential periphery of said core sheets which form said lamination, and armature coils wound around said lamination through said grooves, characterized in that said core sheets are at least partially formed of electromagnetic steel plate, and a soft iron member is provided for partially closing the said open portion of said grooves defined by said aligned slits in said lamination, said soft iron member being a cylindrical unit having a plurality of slots that extend longitudinally thereof, said cylindrical unit receiving said lamination therein, said plurality of superimposed over corresponding grooves in said lamination, and dimensioned to circumferentially and partially close the open portions of said grooves at the circumferential periphery of said core sheets which form said lamination.

2. The rotor for a DC motor as claimed in claim 1, wherein said cylindrical unit comprises ends which serve to prevent the armature coils from overrunning.

3. The rotor for a DC motor as claimed in claim 1 wherein said slits are formed at equal spacings around the circumference of the core sheets.

4. A rotor for a DC motor comprising, an axial lamination of core sheets each having a plurality of radially and inwardly extended slits, said slits having an open portion at the circumferential periphery of said core sheets, said lamination comprised of core sheets of electromagnetic steel plate and core sheets of soft iron plate, said core sheets of soft iron plate being axially laminated alternately with the core sheets of electromagnetic steel plate, said core sheets of both electromagnetic steel plate and soft iron plate having their slits disposed in circumferential alignment so that said respective slits, when laminated and aligned, define longitudinally-disposed grooves in said lamination at said circumferential periphery of said core sheets which form said lamination, armature coils wound around said lamination through said grooves, said open portion of said slits in said soft iron core sheets being partially closed.

5. The rotor for a DC motor as claimed in claim 4 wherein said slits in said soft iron core sheets, defined by a portion of said soft iron core sheets at the circumferential periphery thereof, are narrower than said slits defined by said open portion at the circumferential periphery of said electromagnetic steel plate core sheets.

6. The rotor for a DC motor as claimed in claim 5 wherein said armature coils disposed in said grooves are retained therein by said portion of said soft iron core sheets defining said narrower slits.

7. A rotor for a DC motor comprising, an axial lamination including a plurality of core sheets each having a plurality of radially and inwardly extended slits, said slits having an open portion at the circumferential periphery of said core sheets, said core sheets including core sheets of soft iron plate axially laminated alternately with core sheets of electromagnetic steel plate said core sheets of both electromagnetic steel plate and soft iron plate having their slits disposed in circumferential alignment so that said respective slits, when laminated and aligned, define longitudinally-disposed grooves in said lamination at said circumferential periphery of said core sheets which form said lamination, and armature coils wound around said lamination through said grooves.

8. The rotor for a DC motor as claimed in claim 7 wherein the slits in the soft iron plate core sheets have openings that are partially closed.

9. The rotor for a DC motor as claimed in claim 8 wherein said partial closure in said core sheet of soft iron is provided by a folded portion of said soft iron core sheet in the vicinity of said open portion.

10. The rotor for a DC motor as claimed in claim 9 wherein said slits, defined by said folded portion of said soft iron core sheets at the circumferential periphery thereof, are narrower than said slits defined by said open portion at the circumferential periphery of said electromagnetic steel plate core sheets.

11. The rotor for a DC motor as claimed in claim 10 wherein said armature coils disposed in said grooves are retained therein by said folded portion of said soft iron core sheets during said narrower slits.

* * * * *